United States Patent
Fleischmann et al.

(10) Patent No.: US 8,636,239 B2
(45) Date of Patent: Jan. 28, 2014

(54) BELT RETRACTOR

(75) Inventors: Robert Fleischmann, Neu-Ulm/Pfuhl (DE); Andreas Maunz, Ulm (DE); Hans-Jürgen Divo, Langenau (DE); Gerhard Klingauf, Balzheim (DE); Robert Hofer, Geislingen (DE); Hermann Hasse, Lonsee (DE); Wolfgang Schrade, Blaustein/Wippingen (DE); Armin Toth, Dornstadt (DE)

(73) Assignee: Takata AG, Aschaffenburg (DE)

( * ) Notice: Subject to any disclaimer, the term of this patent is extended or adjusted under 35 U.S.C. 154(b) by 580 days.

(21) Appl. No.: 12/801,150

(22) Filed: May 25, 2010

(65) Prior Publication Data
US 2010/0301152 A1 Dec. 2, 2010

(30) Foreign Application Priority Data

May 28, 2009 (DE) .......................... 10 2009 023 625
Jul. 3, 2009 (DE) .......................... 10 2009 032 101

(51) Int. Cl.
*B60R 22/36* (2006.01)
*B60R 22/46* (2006.01)
*B60R 22/28* (2006.01)

(52) U.S. Cl.
USPC ...................... 242/374; 242/379.1; 242/383.1

(58) Field of Classification Search
USPC ........ 242/374, 379.1, 383.3, 384.3, 382, 383, 242/383.1; 280/805–807; 297/470–472, 297/476–478
See application file for complete search history.

(56) References Cited

U.S. PATENT DOCUMENTS

| | | | |
|---|---|---|---|
| 4,187,925 A * | 2/1980 | Lindblad .......................... 180/268 |
| 5,522,564 A | 6/1996 | Schmidt et al. |
| 5,967,442 A * | 10/1999 | Wier .......................... 242/379.1 |
| 6,105,893 A | 8/2000 | Schmidt et al. |
| 6,250,579 B1 | 6/2001 | Bannert et al. |
| 6,364,238 B1 | 4/2002 | Weller et al. |
| 6,416,006 B1 * | 7/2002 | Huber .......................... 242/379.1 |
| 2001/0006204 A1 * | 7/2001 | Kajiyama .................. 242/379.1 |
| 2003/0034644 A1 | 2/2003 | Wier |
| 2004/0056136 A1 * | 3/2004 | Blum et al. ................. 242/379.1 |
| 2004/0251364 A1 | 12/2004 | Kim |
| 2004/0256511 A1 | 12/2004 | Klingauf et al. |
| 2005/0178870 A1 * | 8/2005 | Loffler et al. .................. 242/374 |
| 2006/0163410 A1 * | 7/2006 | Blum et al. ................. 242/379.1 |
| 2008/0087754 A1 * | 4/2008 | Aihara et al. ................. 242/374 |
| 2008/0265080 A1 | 10/2008 | Braun et al. |

FOREIGN PATENT DOCUMENTS

| | | |
|---|---|---|
| DE | 43 31 027 A1 | 3/1995 |
| DE | 196 09 524 A1 | 9/1997 |
| DE | 197 47 461 A1 | 4/1999 |
| DE | 299 09 252 U1 | 11/1999 |

(Continued)

*Primary Examiner* — Sang Kim
*Assistant Examiner* — Scott Haugland
(74) *Attorney, Agent, or Firm* — Foley & Lardner LLP (57) ABSTRACT

The invention relates to a belt retractor for winding up and unwinding a safety belt, with at least one force transmission element which is held by a first part of the belt retractor and which can be connected to a second part of the belt retractor, the force transmission element being held in a recess of the first part in such a way that it can be pressed axially into the recess of the first part, with the result that the connection to the second part is broken.

14 Claims, 10 Drawing Sheets

(56) References Cited

FOREIGN PATENT DOCUMENTS

| DE | 200 04 674 U1 | 9/2000 |
| DE | 102 34 708 A1 | 2/2003 |
| DE | 10 2006 019 270 A1 | 10/2007 |
| DE | 10 2007 020 000 A1 | 11/2008 |
| EP | 1 219 510 A2 | 7/2002 |

\* cited by examiner

BELT RETRACTOR

BACKGROUND OF THE INVENTION

The invention relates to a belt retractor.

A belt retractor is known, for example, from European Laid-Open Publication EP 1 219 510 A2. This belt retractor serves for winding up and unwinding a safety belt and has as a force transmission element a connecting pin in the form of a shear pin which is held by a first part of the belt retractor and which is connected to a second part of the belt retractor. In accident-free normal operation, the shear pin connects the locking base and the belt spindle to one another, so that these cannot execute any movement or rotation in relation to one another. The shear pin is held in a recess of the belt spindle and projects into the locking flange, so that it connects the belt spindle and locking flange to one another. In the event of an accident at high speed, a very high shear force acts upon the shear pin, to be precise when the vehicle occupant dives into the safety belt, so that the shear pin shears off and the connection between the locking base and the belt spindle is broken. The shearing off may subsequently result in a relative rotation between the belt spindle and the locking base, so that belt force limitation, for example by means of a torsion bar, becomes possible. As long as the shear pin is not sheared off, the function of any torsion bar present continues to be ineffective.

Furthermore, German Laid-Open Publication DE 197 47 461 A1 discloses a belt retractor in which two torsion bars are used for belt force limitation.

German Patent Specification DE 196 09 524 C2 describes a belt retractor with a torsion bar, the function of which is activated by means of a pawl mechanism as a function of the operating state of a tautener drive. In the initial state, the torsion bar is cut out, to be precise since a force limiter pawl is positioned into a first toothed ring and the belt spindle is connected to a toothing of a shaft tube via the force limiter pawl and the first toothed ring. The torsion bar is cut in only when, after a cut-in of the tautener drive, a tautener pawl engages into an internal toothing of a second toothed ring and a relative movement subsequently occurs between the second toothed ring and a slotted ring. As a result of the relative movement of the slotted ring, the force limiter pawl is pivoted away, so that the latter comes out of engagement with the first toothed ring and the belt spindle can subsequently rotate freely under the torsion of the torsion bar.

OBJECT OF THE INVENTION

The object on which the invention is based is to specify a belt retractor, in which undesirable force excesses or force peaks, particularly during the belt force limitation phase, are avoided.

BRIEF SUMMARY OF THE INVENTION

An exemplary embodiment of the invention relates to a belt retractor for winding up and unwinding a safety belt, with at least one force transmission element which is held by a first part of the belt retractor and which can be connected to a second part of the belt retractor, the force transmission element being held in a recess of the first part in such a way that it can be pressed axially into the recess of the first part, with the result that the connection to the second part is broken.

One advantage of this belt retractor is that no force excesses or force peaks can be caused by the force transmission element which connects the first part of the belt retractor to the second part of the belt retractor; for, to separate the first part and the second part from one another, the force transmission element is pressed axially into a recess of the first part, with the result that the connection to the second part is broken. There is therefore no shearing off or breaking off of the force transmission element, and therefore force excesses during the breaking of the connection between the first and the second part are reliably avoided.

The force transmission element may have any desired form, and it may have, in cross section, a round or angular or any other desired shape. Preferably, the force transmission element is axially displaceable or shiftable along its own longitudinal direction. For example, the force transmission element is displaceable or shiftable in the longitudinal direction of the belt spindle of the belt retractor or parallel to its longitudinal direction.

The force transmission element may, for example, comprise a connecting pin or be formed by a connecting pin. Of course, the belt retractor may have two or more connecting pins and/or two or more first parts, the connecting pins in each case being pressed into an assigned recess of a first part assigned to them. Also, two or more connecting pins may cooperate with one and the same second part.

The force transmission element can be pressed into the recess of the first part, for example, by the second part.

According to a preferred refinement of the belt retractor, there is provision for the second part to be formed by a pivotable connecting pawl. Preferably, the pivotable connecting pawl has a guide slot in which the connecting pin is guided.

The first part is formed preferably by a locking base of the belt retractor, which locking base is connected to a frame of the belt retractor in the event of an abrupt pull-out of the belt band.

The second part is preferably held pivotably on the belt spindle or belt reel or on a spindle connection part connected fixedly in terms of rotation to the belt spindle.

Preferably, the belt retractor has an at least two-stage force limitation device, the cut-in of at least one force limitation stage of the force limitation device taking place as a result of the cooperation of the connecting pin and of the second part.

The guide slot of the second part is preferably shaped in such a way that, in the event of a relative movement between the belt spindle of the belt retractor and the locking base of the belt retractor, the second part is pivoted and the connecting pin is pressed into the recess of the first part. For example, the cut-in of at least one force limitation stage of the force limitation device is triggered by the pivoting of the second part.

A coupling wheel is preferably arranged coaxially with respect to the belt spindle, into the internal toothing of which coupling wheel the second part is positioned in the event of a relative movement between the belt spindle and the locking base, the coupling wheel being connected to at least one of the force limitation stages of the force limitation device.

At least one detent pawl may be fastened pivotably to the locking base of the belt retractor, which detent pawl is pivoted in the event of an abrupt pull-out of the belt band and connects the locking base to a frame of the belt retractor.

The first stage of the at least two-stage force limitation device is activated preferably by the pivoting of the detent pawl and by a relative movement between the belt spindle and locking base, and the second stage or a further stage is triggered preferably by the pivoting of the second part.

For example, the second part is formed by a pivotable connecting pawl which is pivoted in the event of a relative movement between the belt spindle and the first part and which triggers a further, for example the next, force limitation stage of the force limitation device.

Force limitation in the first and/or in the second force limitation stage of the force limitation device is preferably based at least also on the twisting of a torsion bar.

The guide slot of the second part has preferably at one slot end a ramp or oblique face which presses the connecting pin into the recess of the first part as soon as the connecting pin butts against the ramp or oblique face in the course of a relative movement between the connecting pin and guide slot.

The connecting pin preferably likewise has a ramp or oblique face which cooperates with the ramp or oblique face of the guide slot when the connecting pin is pressed into the recess of the first part.

Another exemplary embodiment relates to a belt retractor which is distinguished in that the first part is formed by a locking base of the belt retractor, which locking base is connected to a frame of the belt retractor in the event of an abrupt pull-out of the belt band, the second part is formed by a pivotable connecting pawl which is held pivotably indirectly or directly on the belt spindle and has a guide slot, the connecting pin is guided in the guide slot, the guide slot is shaped in such a way that the pivotable connecting pawl is pivoted in the event of a relative movement between the spindle and the locking base, and the belt retractor has an at least two-stage force limitation device, the changeover from at least one force limitation stage of the force limitation device to a next force limitation stage of the force limitation device being triggered by the pivoting of the pivotable connecting pawl.

According to yet another exemplary embodiment, there is provision for the first part to be formed by a belt spindle or belt reel and for the second part to be formed by a locking flange.

In order to simplify the displaceability of the force transmission element in the recess, it is considered advantageous if the recess extends, at least essentially, parallel to the longitudinal direction of the belt reel or parallel to the axis of rotation of the belt reel. The recess may be formed, for example, by a blind hole which preferably extends longitudinally in the way described.

According to a particularly preferred refinement, there is provision for the belt retractor to have an inertia element which can assume a first relative position and a second relative position in relation to the belt reel.

Preferably, the inertia element, in the first relative position, presses the force transmission element into the recess of the belt reel to a lesser depth, so that the force transmission element can assume its interlock position and can be in engagement with the locking flange, that is to say the belt reel and the locking flange are connected to one another.

In the second relative position (in relation to the belt reel), the inertia element presses the force transmission element into the recess of the belt reel preferably to a depth such that the force transmission element comes out of engagement with the locking flange and into its release position, that is to say the belt reel and the locking flange are separated.

The inertia element preferably has a first latching depression and a second latching depression. In this case, the first latching depression is preferably configured to be deeper than the second latching depression.

The inertia element may be formed, for example, by a ring or a ring segment. Preferably, the ring center or ring center point of the ring or of the ring segment is located in the region of the axis of rotation of the belt reel. Preferably, the ring center point lies on the axis of rotation of the belt reel, in order to allow a relative movement between the inertia element and the belt reel as a result of a rotational movement of the belt reel in relation to the inertia element.

The first latching depression is preferably arranged in such a way that, in the first position of the inertia element, the force transmission element engages into this first latching depression. The second latching depression is preferably arranged in such a way that, in the second position of the inertia element, the force transmission element engages into this second latching depression.

In order to simplify a transition from the first latching depression into the second latching depression, it is considered advantageous if the first latching depression is ramp-shaped and has a low-inclination flank and a steep flank, the low-inclination flank facing the second latching depression and the steep flank facing away from the second latching depression.

The form of the second latching depression may have a similar appearance; for example, the second latching depression, too, is ramp-shaped. It may likewise have a low-inclination flank and a steep flank, the low-inclination flank preferably facing away from the first latching depression and the steep flank facing the first latching depression.

In order to make it possible in a particularly simple way to have a relative movement of the inertia element, it is considered advantageous if the inertia element is held in a guide recess which is larger than the inertia element, so that the inertia element can be positioned, for example displaced, differently in the guide recess and, for example, can assume the first relative position (in relation to the belt reel) or the second relative position (in relation to the belt reel). The overlength of the guide recess, that is to say the difference between the length of the guide recess and the length of the inertia element, is preferably at least as great as the distance between the two latching depressions.

Preferably, the guide recess is formed at least partially in the locking base or at least partially in the belt reel. Also, it may be formed at least partially both in the belt reel and in the locking base.

The force transmission element is preferably of U-shaped cross section and has, for example, two legs and a bottom connecting the two legs. The two legs may laterally surround the inertia element or laterally bear against this, and the bottom may come to bear on or against the latter, in the first position of the inertia element, in the first latching depression and, in the second position of the inertia element, in the second latching depression. Also, the force transmission element may be of L-shaped cross section and have only one leg which is connected to the bottom bearing against the inertia element.

Preferably, a spring is present in the recess and presses the force transmission element out of the recess against the inertia element, so that the force transmission element and the inertia element bear one against the other independently of the relative position between the belt reel and the locking base. The force transmission element is also held in the deep or shallow latching depression by the spring, since the spring presses the force transmission element in the direction of the inertia element and therefore in the direction of the respective latching depression.

According to a particularly preferred refinement of the belt retractor, there is provision for this to have a tautener drive which cooperates with the belt reel and which can drive the latter in order to tauten the belt band. Preferably, when the tautener drive is put into operation, the force transmission element is transferred from the interlock position into the release position.

Preferably, there is provision for the rotational acceleration of the belt reel to give rise, when the tautener drive is put into operation, to a relative movement between the inertia element and the belt reel, and for the inertia element to come from its first position, in which it presses the force transmission element into the recess of the belt reel to a lesser depth, into its second position, in which it presses the force transmission element deeply into the recess of the belt reel, so that the force transmission element comes out of engagement with the locking flange and into its release position and the belt reel and locking flange are separated.

Particularly preferably, the rotational acceleration of the belt reel gives rise to a relative movement between the inertia element and the belt reel, so that the force transmission element comes from the first latching depression of the inertia element, in which it is pressed into the recess of the belt reel to a lesser depth, into the second latching depression of the inertia element, in which it is pressed by the inertia element deeply into the recess of the belt reel, with the result that the force transmission element comes out of engagement with the locking flange and into its release position and the belt reel and locking flange are separated.

The force transmission element is preferably configured in such a way that it can break off, so that force transmission between the locking base and the belt reel can take place via a force limitation device, for example a torsion bar, even though the force transmission element has not previously been brought into its inactive position.

Another exemplary embodiment relates to a belt retractor for a safety belt, with a belt spindle for winding up and unwinding the safety belt and with a lockable locking flange connected to the belt spindle, a force transmission element being present, which is held in a recess of the belt spindle and can be in engagement with the locking flange and can connect the belt spindle to the locking flange, the force transmission element being guided displaceably in the recess of the belt spindle and being capable of assuming an interlock position and a release position, the force transmission element projecting further out of the recess in the interlock position than in the release position, with the result that the force transmission element and the locking flange are in engagement, and the force transmission element being introduced more deeply into the recess in the release position, and the force transmission element and locking flange being out of engagement.

The invention is explained in more detail below by means of exemplary embodiments: thus, for example.

The same reference symbols are always used in the figures for identical or comparable components for the sake of clarity.

Figure 1:
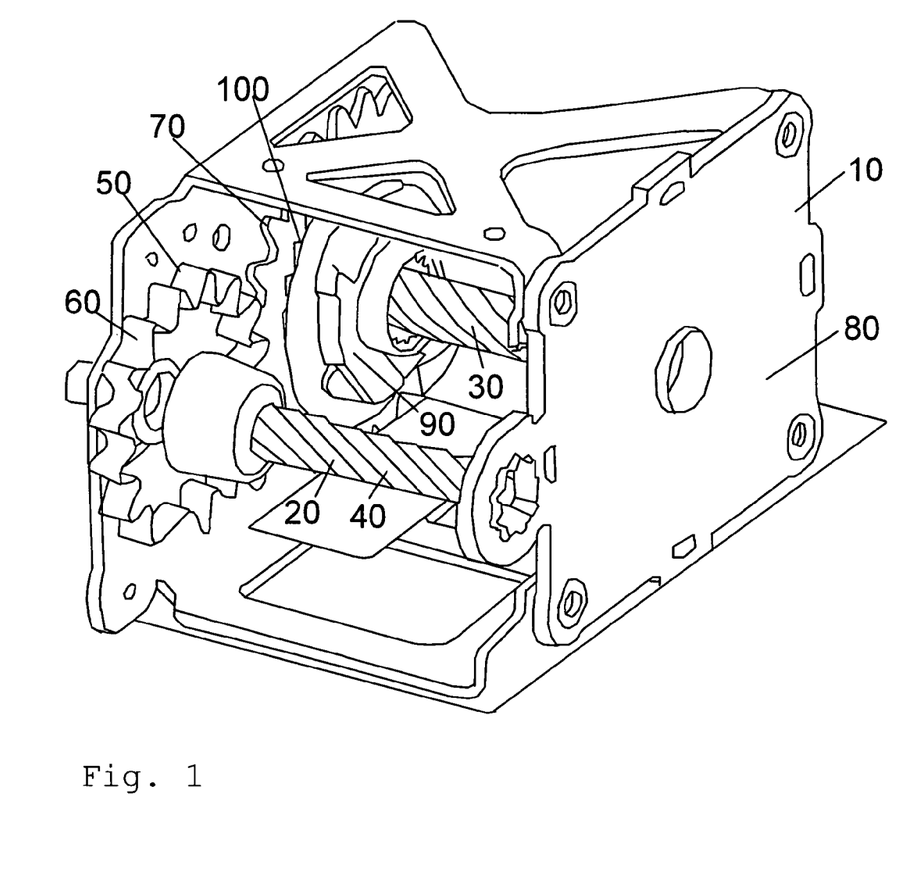
FIG. 1 shows an exemplary embodiment of part of a belt retractor according to the invention in a three-dimensional view.

FIG. 1 shows part of an exemplary embodiment of a belt retractor; this is identified by reference symbol 10. It can be seen that the belt retractor 10 is equipped with a two-stage force limitation device 20 which has a first torsion bar 30 and a second torsion bar 40. The first torsion bar 30 forms a first force limitation stage of the two-stage force limitation device 20, and the second torsion bar 40 forms a second force limitation stage of the force limitation device 20. The two torsion bars 30 and 40 may, for example, be oriented parallel to one another.

The first torsion bar 30 and the second torsion bar 40 are connected to one another via a coupling device 50. The coupling device 50 comprises, inter alia, a driving wheel 60 which is connected to the second torsion bar 40. A coupling wheel 70 of the coupling device 50 is in engagement with the driving wheel 60.

If, in the event of an abrupt pull-out of the belt band, a locking base, not illustrated in any more detail in FIG. 1, of the belt retractor 10 is connected fixedly in terms of rotation to the frame 80 of the belt retractor, a relative movement occurs between the locking base and a spindle connection part 90 which is connected fixedly in terms of rotation to a belt spindle, not illustrated in FIG. 1 for the sake of clarity, of the belt retractor 10 or forms an integral part of said belt spindle. Such a relative movement between the locking base and the spindle connection part 90 causes connecting pawls, not illustrated in any more detail in FIG. 1, which are connected to the spindle connection part 90, to be pivoted outward and to be positioned into an internal toothing 100, merely indicated in FIG. 1, of the coupling wheel 70. As soon as the spindle connection part 90 is coupled to the coupling wheel 70, in the event of a rotation of the spindle connection part 90 or a twist of the first torsion part 30 the coupling wheel 70 and the driving wheel 60 are also corotated, so that the second torsion bar 40 is also twisted. In other words, the coupling device 50 therefore serves for coupling the spindle connection part 90 to the driving wheel 60, in order to activate the second torsion bar 40 and consequently the second force limitation stage of the two-stage force limitation device 20.

Figure 9:
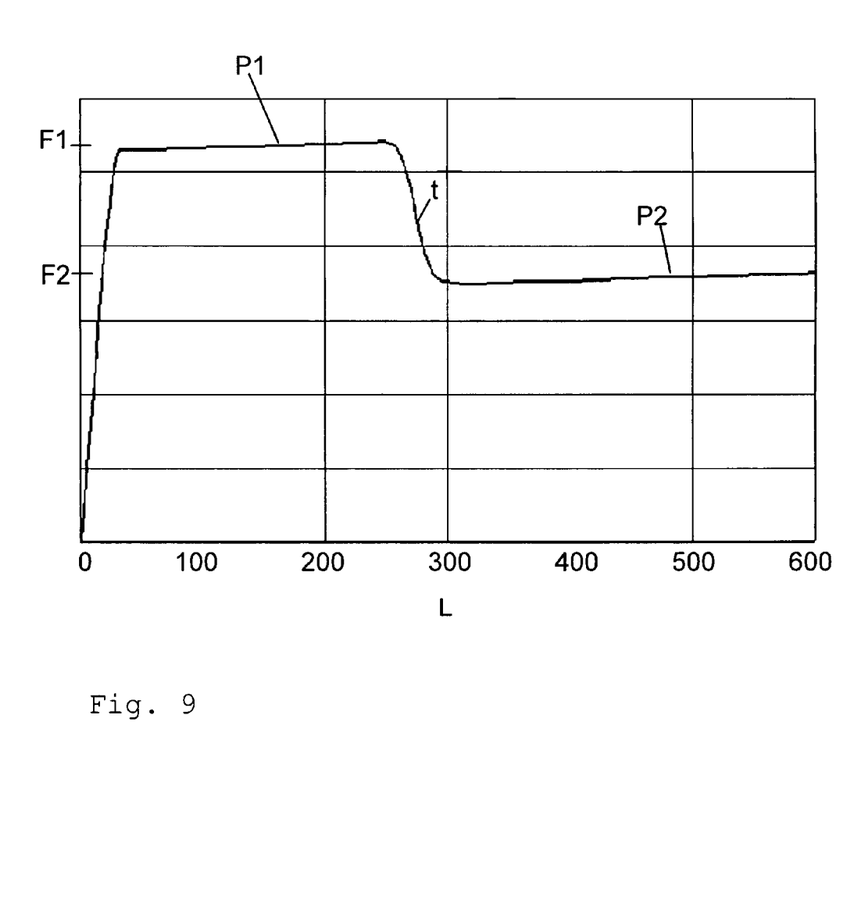
FIG. 9 shows the time profile of the belt restraining force during belt force limitation in the belt retractor according to FIG. 1.

The time profile of the active belt retaining force F against the belt band pull-out length L is shown by way of example in FIG. 9. It can be seen that, in a first restraining phase P1, a high belt restraining force F1 acts because both torsion bars 30 and 40 are twisted; in a second phase P2 after a deactivation of the second torsion bar 40 at the time point t, a reduced belt restraining force F2 acts, which is provided by the first torsion bar 30. The cut-off or deactivation of the second torsion bar 40 may take place, for example, by means of a pyrotechnic drive which interrupts the force flux to the second torsion bar 40.

Figure 2:
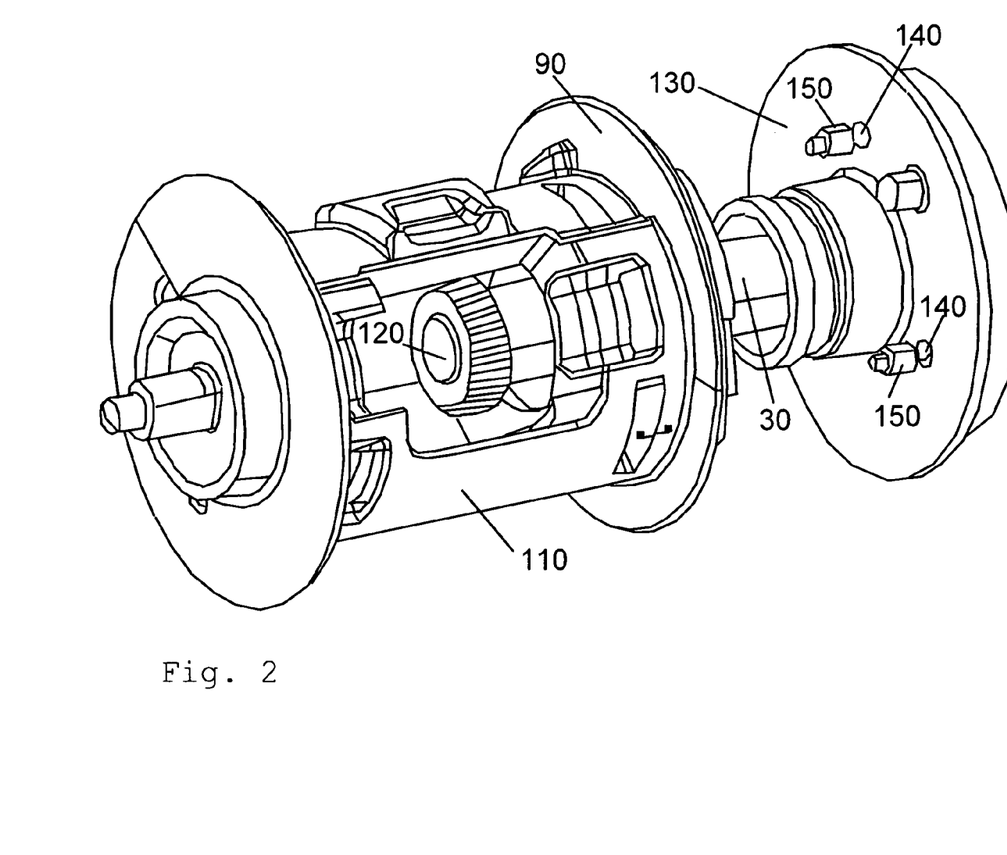
FIG. 2 shows the cooperation between a spindle connection part and a locking base of the belt retractor according to FIG. 1 in a three-dimensional view in an exploded illustration.

FIG. 2 shows the internal set-up of the belt retractor 10 according to FIG. 1 in more detail. What can be seen is the belt spindle 110, not illustrated in FIG. 1, through which the first torsion bar 30 is guided. A connection portion 120 of the first torsion bar 30 is connected fixedly in terms of rotation to the belt spindle 110.

Furthermore, it can be seen in FIG. 2 how the spindle connection part 90 cooperates with the locking base of the belt retractor 10. The locking base is identified by reference symbol 130.

The locking base 130 has recesses 140 which are formed, for example, by blind holes or through holes. The recesses 140 extend axially or in the axial direction, that is to say parallel to the longitudinal direction of the belt spindle or parallel to the longitudinal direction of the first torsion bar 30.

A connecting pin 150 is inserted into each of the recesses 140. As will be explained in more detail further below, the connecting pins 150 are designed to be displaceable in the recesses 140 axially or along their longitudinal direction, so that they can be countersunk fully or completely in the recesses 140. As shown, the connecting pins 150 may be formed by separate pins; alternatively, they may also be injection-molded onto the locking base 130 and be connected to the locking base via a predetermined break point.

In the basic state, that is to say before the force limitation device 20 is activated, the connecting pins 150 project out of the recesses 140 and engage into pivotable connecting pawls, not illustrated in any more detail in FIG. 2, which are held on or by the spindle connection part 90.

Figure 3:
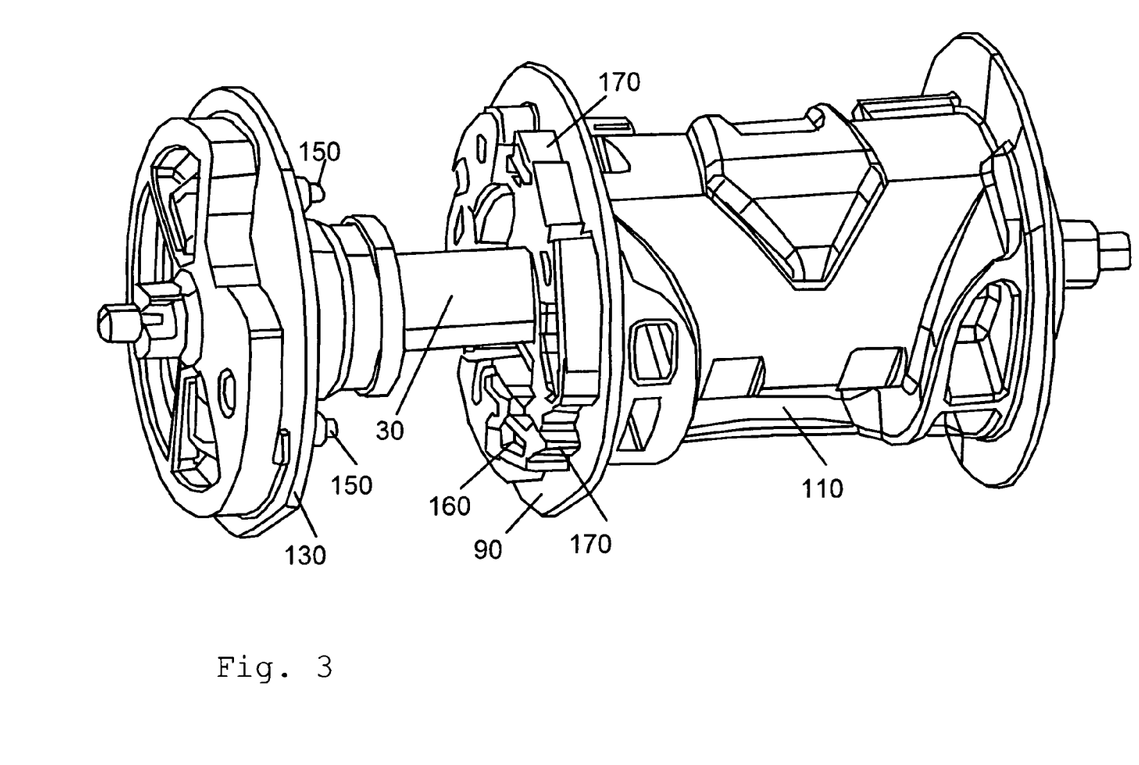
FIG. 3 shows the locking base and the spindle connection part according to FIG. 2 in another view.

FIG. 3 shows the arrangement of the locking base 130 in relation to the spindle connection part 90 in yet another view. What can be seen are the connecting pins 150 which engage in each case into a guide slot 160 of a pivotable connecting pawl 170. The locking base 130 has, for example, three connecting pins which cooperate, for example, with three pivotable connecting pawls 170. Only two connecting pins 150 and two pivotable connecting pawls 170 can be seen in FIG. 3.

Figure 4:
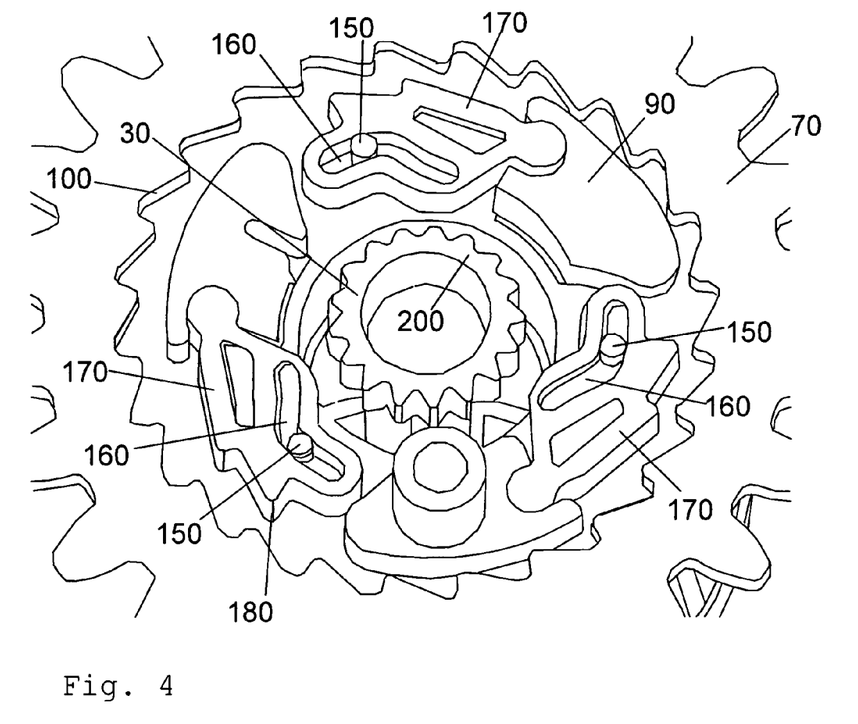
FIG. 4 shows the cooperation between connecting pins of the locking base and connecting pawls of the spindle connection part in detail.

FIG. 4 illustrates in more detail how the connecting pins 150 of the locking base 130 engage into the guide slots 160 of the pivotable connecting pawls 170. The pivotable connecting pawls 170 are mounted rotatably on the spindle connection part 90.

As soon as a relative movement occurs between the locking base 130 and the spindle connection part 90, the connecting pins 150 are moved in relation to the spindle connection part 90, so that they cause an outward pivoting of the connecting pawls 170 on account of the guide slots 160. As a result of such a pivoting of the connecting pawls 170, coupling teeth 180 of the connecting pawls 170 come into engagement with the internal toothing 100 of the coupling wheel 70 which is arranged coaxially with respect to the belt spindle 110 and coaxially with respect to the spindle connection part 90. As soon as a connection is made between the connecting pawls 170 and the coupling wheel 70, the coupling wheel 70 is corotated with the spindle connection part 90 when a pull-out of the belt band occurs during belt force limitation. Owing to this coupling, in the event of a rotation of the belt spindle 110, the driving wheel 60 (cf. FIG. 1) is also rotated, so that a twisting of the second torsion bar 40 occurs.

Furthermore, for clearer understanding, FIG. 4 also illustrates a further connection portion 200 of the first torsion bar 30. This further connection portion 200 is connected fixedly in terms of rotation to the locking base 130 and is retained by the latter when the locking base 130 is connected to the frame 80 of the belt retractor 10 in the event of an abrupt pull-out of the belt band.

Figure 5:
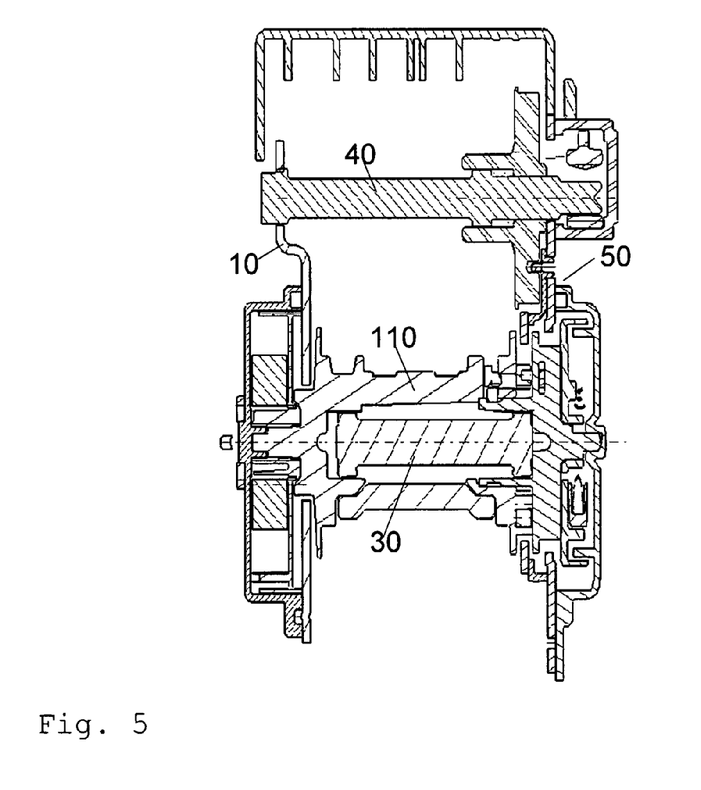
FIG. 5 shows a further exemplary embodiment of a belt retractor in cross section.

The cooperation of the two torsion bars 30 and 40 and the functioning of the coupling device 50 are shown again in cross section in FIG. 5. The belt spindle, 110 through which the first torsion bar 30 is guided, can be seen. Furthermore, the second torsion bar 40 can be seen, which is arranged parallel to the first torsion bar 30 and is corotated in the event that the coupling device 50 is coupled.

Figure 6:
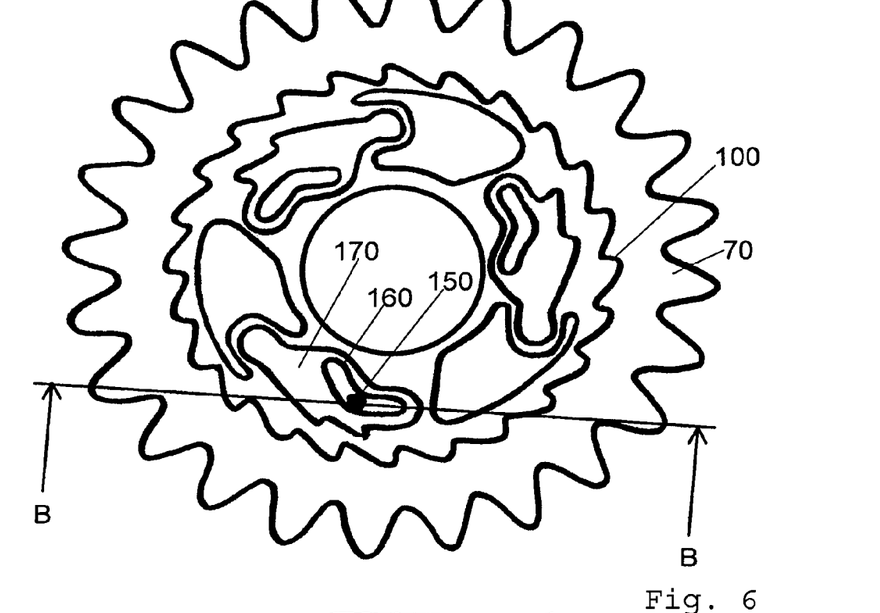
FIG. 6 shows the cooperation between the locking base and the spindle connection part in the event of a relative movement between the two parts in a first phase.
Figure 7:
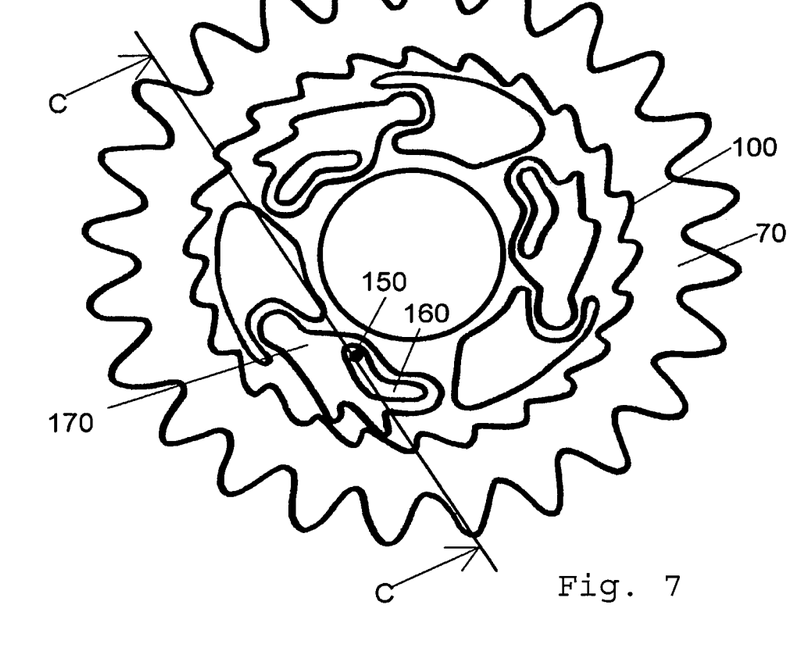
FIG. 7 shows the cooperation between the locking base and the spindle connection part in a subsequent second phase.
Figure 8:
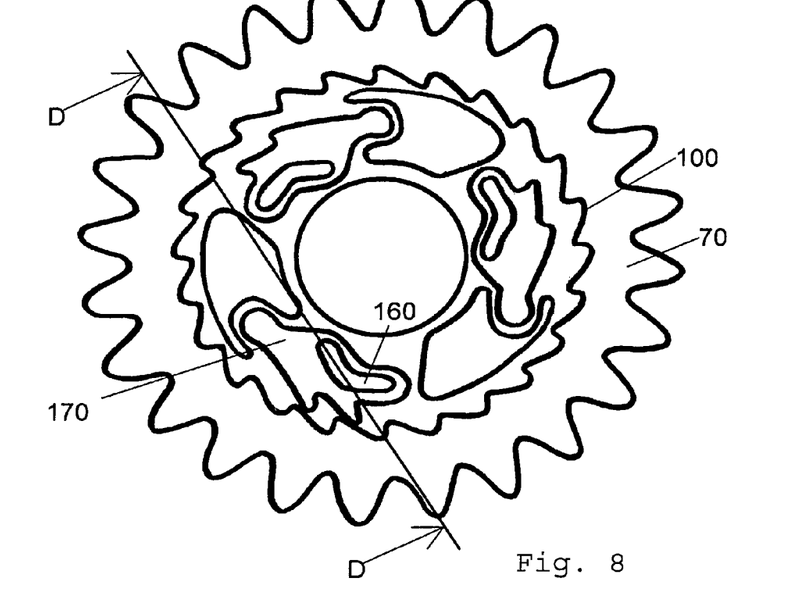
FIG. 8 shows a cooperation between the locking base and the spindle connection part in a subsequent third phase.

It is explained in more detail once again, by means of FIGS. 6, 7 and 8, how the connecting pins 150 cooperate with the connecting pawls 170.

FIG. 6 shows, in this regard, a middle position in which the connecting pins 150 are located approximately in the middle of the guide slot 160. The state shown in FIG. 6 arises after the locking base 130 is coupled to the frame 80 and a relative movement between the locking base and the spindle connection part 90 has already occurred. On account of this relative movement and because the movement of the connecting pins 150 in the guide slots 160 has already taken place, the pivotable connecting pawls 170 are already pivoted outward slightly, but full coupling into the internal toothing 100 of the coupling wheel 70 has not yet taken place.

Figure 6B:
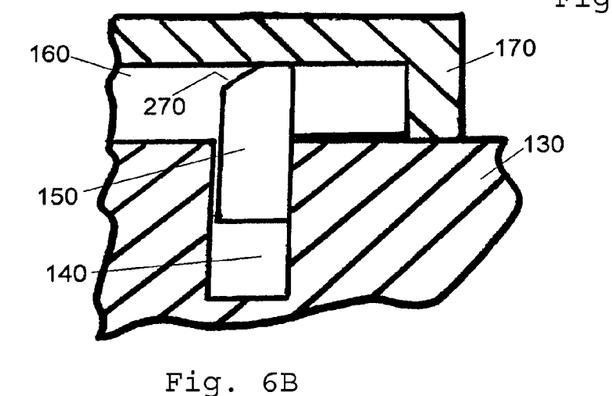
FIG. 6B is a cross-sectional view of the locking base and the spindle connection part of FIG. 6 taken along line B-B.

Furthermore, FIG. 6 shows the connecting pin 150 within the guide slot 160 in cross section in a section along the line B-B. It can be seen that the connecting pin 150 is pushed only halfway into the recess 140 in the form of a blind hole and therefore projects with approximately half its length out of the locking base 130 and engages into the guide slot 160. Alternatively, the connecting pins 150 may be pushed even more deeply into the respective recess 140, preferably up to ⅔ of the length of the connecting pins.

Figure 7B:
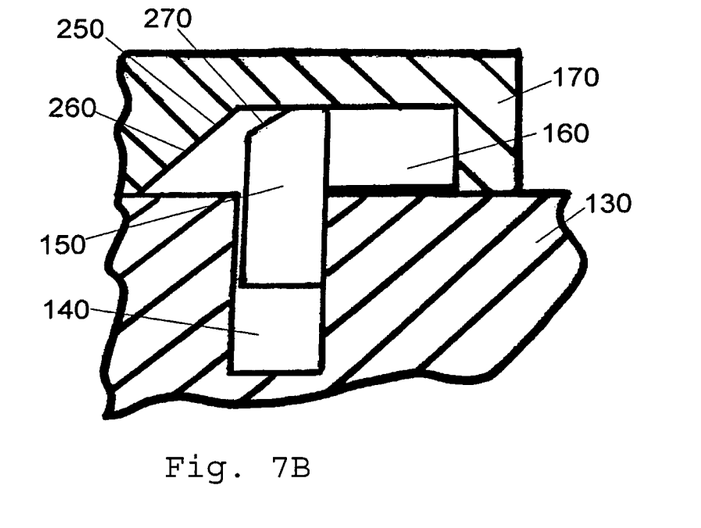
FIG. 7B is a cross-sectional view of the locking base and the spindle connection part of FIG. 7 taken along line C-C.

FIG. 7 shows a state subsequent in time, in which, as a result of a further relative rotation of the spindle connection part 90 with respect to the locking base 130, the connecting pins 150 come into the end region of the guide slots 160. It can be seen, in a section along the line C-C, that the connecting pin 150 has already almost reached the slot end 250 of the guide slot 160. Furthermore, FIG. 7 shows that the guide slot 160 has in the region of its slot end 250 a ramp or oblique face 260 which cooperates with a corresponding ramp or oblique face 270 on that end of the connecting pin 150 which faces the guide slot 160. If, then, the spindle connection part 90 is rotated further in relation to the locking base 130, the slot end 250 and consequently the ramp or oblique face 260 of the guide slot 160 butt against the ramp or oblique face 270 of the connecting pin 150 and press the latter axially or in the axial direction into the recess 140 in the form of a blind hole. By being pressed in in this way, the connecting pin 150 is countersunk fully, or at least virtually fully, in the locking base 130, so that the connecting pin 150 loses connection with the guide slot 160 or with the pivotable connecting pawl 170.

Figure 8B:
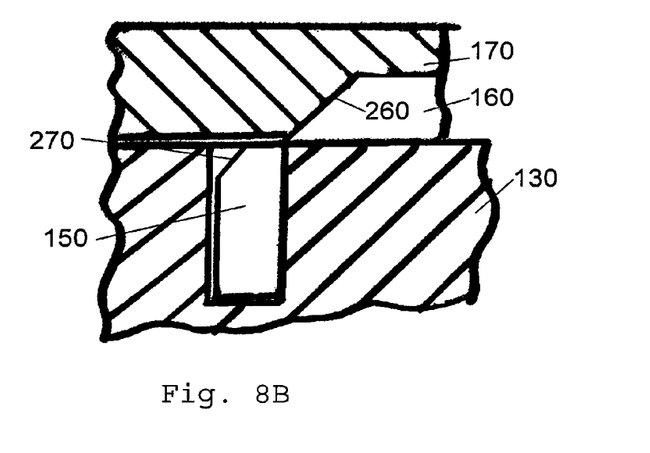
FIG. 8B is a cross-sectional view of the locking base and the spindle connection of FIG. 8 taken along line D-D.

FIG. 8 illustrates a state in which the spindle connection part 90 has been rotated even further with respect to the locking base 130 and the ramp or oblique face 260 of the guide slot 160 has pressed the connecting pin 150 fully into the recess 140 in the form of a blind hole, so that the locking base 130 and the spindle connection part 90 are then uncoupled. The spindle connection part 90 can then rotate freely with respect to the locking base 130 because the locking base 130 and the spindle connection part 90 are uncoupled from one another. However, in spite of the uncoupling between the spindle connection part 90 and locking base 130, the coupled state of the pivotable connecting pawls 170 and consequently their engagement into the internal toothing 100 of the coupling wheel 70 remain. The coupling device 50 thus remains coupled, so that the second torsion part 40 also has to be twisted when the first torsion bar 30 is rotated.

If, after a predetermined belt band pull-out length has been unrolled or after a predetermined term has elapsed, the second force limitation stage of the two-stage force limitation device 20 is to be cut out or the coupling device 50 is to be uncoupled, this can take place by means of an uncoupling mechanism, not illustrated in any more detail in FIG. 1. Such an uncoupling mechanism may, for example, be of a pyrotechnic type.

An exemplary embodiment of the invention is explained below, by way of example, in connection with FIG. 1.

Figure 10:
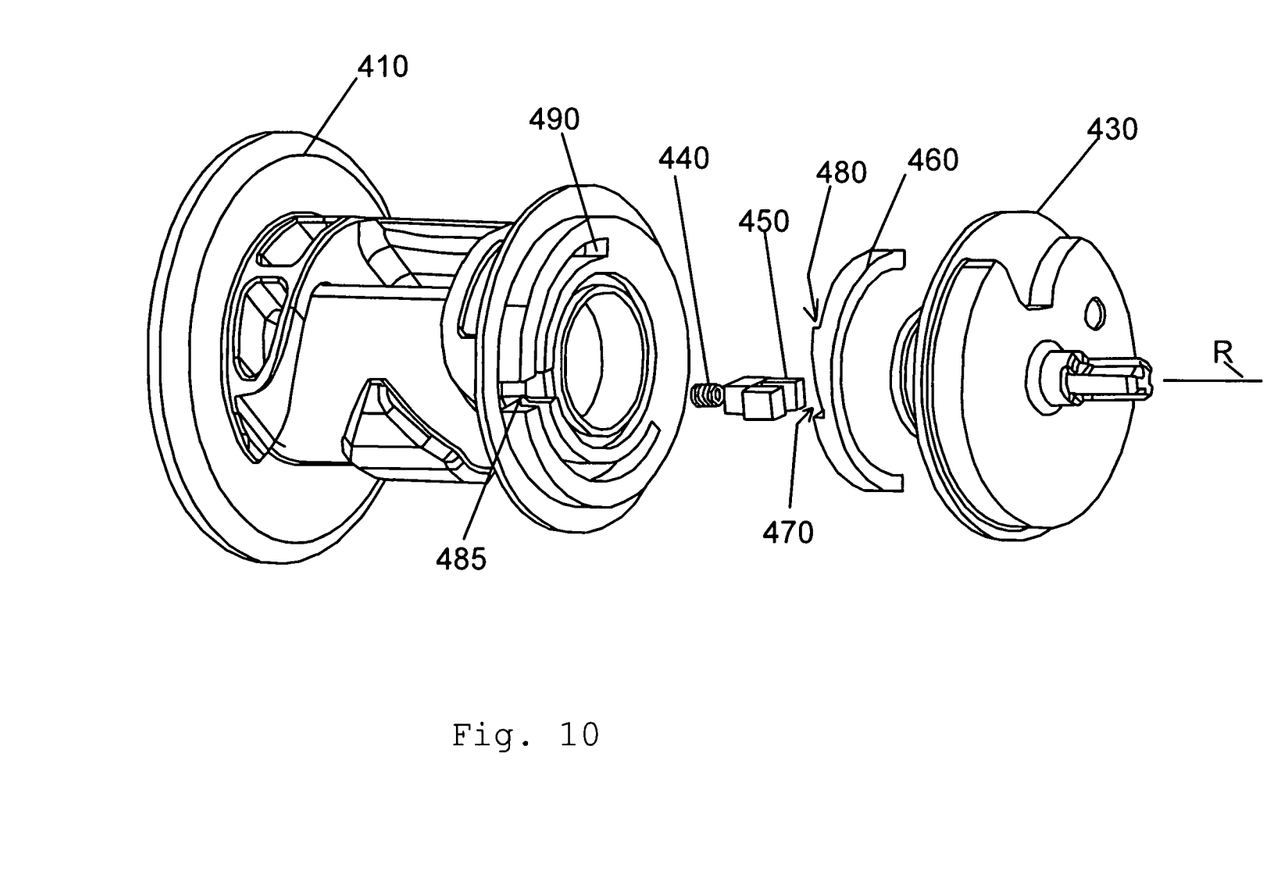
FIG. 10 shows a further exemplary embodiment of part of a belt retractor according to the invention in a three-dimensional view.

FIG. 10 shows a locking-flange/spindle connection for a belt retractor with a belt reel (belt spindle) 410, with a torsion bar, not illustrated, with a locking base or locking flange 430 and with a force transmission element 450 mounted resiliently by means of a spring 440. The torsion bar is connected fixedly in terms of rotation with one bar end thereof to the belt reel 410 and with its other bar end to the locking base 430.

If, in the event of an abrupt pull-out of the belt band, the locking flange 430 is connected fixedly in terms of rotation to a frame of the belt retractor, a relative movement between the locking flange 430 and the belt reel 410 can occur only when the force transmission element 450 is inactive and does not engage into the locking flange 430. To be precise, if the force transmission element 450 engages into the locking flange, the locking flange 430 and the belt reel 410 are connected to one another by means of the force transmission element 450, as a result of which, in turn, a relative rotation is prevented.

Moreover, the belt retractor has a tautener drive, not shown in FIG. 10, which is connected to the belt reel and which can rotate the latter in order to tauten the safety belt; the torsion bar is preferably not connected directly to the tautener drive, but only indirectly via the belt reel 410.

The force transmission element 450 is, for example, of U-shaped cross section and cooperates with a semicircular inertia element 460 which has two latching depressions 470 and 480.

The force transmission element 450 is held displaceably in a recess 485 of the belt reel 410. The recess 485 is formed, for example, by a blind hole which extends, at least essentially, parallel to the longitudinal direction of the belt reel or parallel to the axis of rotation R of the belt reel 410. The spring 440 is a compression spring which presses the force transmission element 450 out of the recess 485 and therefore against the inertia element 460. Moreover, the spring 440 thus has the function of fixing the force transmission element 450 in the latching depression 470 or the latching depression 480 by pressing it in.

The inertia element 460 may be formed, for example, by a ring or a ring segment. Preferably, the (imaginary) ring center or the (imaginary) ring center point of the ring or of the ring segment is located in the region of or on the axis of rotation R of the belt reel 410. The ring segment may, for example, be semicircular or approximately semicircular and cover a circle angle of between 45 and 315 degrees.

The inertia element 460 is guided in a guide recess 490 of the belt reel 410. The form of the guide recess 490 is adapted to the form of the inertia element 460; merely the length of the guide recess 490 is markedly larger than the length of the inertia element 460, so that the inertia element 460 is displaceable in the guide recess 490 in the longitudinal direction of the guide recess. The overlength of the guide recess 490, that is to say the difference between the length of the guide recess 490 and the length of the inertia element 460, is at least as large as the distance between the two latching depressions 470 and 480, so that the force transmission element 450 can engage into each of the two latching depressions.

Owing to the arrangement of the imaginary ring center point on the axis of rotation R and to the overlength of the guide recess 490, a relative movement between the inertia element 460 and the belt reel 410 becomes possible as a result of rotational movement of the belt reel 410 in relation to the inertia element 460 about the axis of rotation R.

The latching depression 470 is deeper than the latching depression 480. In the basic position or delivery state of the belt retractor, the force transmission element 450 is held by the deeper latching depression 470, so that the force transmission element 450 can engage into the locking base 430 and connect the belt reel 410 to the locking base 430.

If, then, the belt reel is abruptly set in rotational movement by the tautener drive, the semicircular inertia element 460 is displaced in its guide recess 490, because, as a consequence of inertia, it leaves its state of movement unchanged, whereas the guide recess 490 is accelerated together with the belt reel. The force transmission element 450 will thus slip out of the deep latching depression 470 and subsequently slip into the shallow latching depression 480. The shallow latching depression 480 has such a shallow dimensioning that the force transmission element 450 is no longer in contact with the locking base 430 and the connection between the belt reel and the locking base 430 is maintained solely by means of the torsion bar.

The force transmission element 450 is thus active only in the phase prior to belt tautening and therefore prior to belt force limitation. After its inertia-induced relative movement, the inertia element 460 is preferably not reset, so that, after the force transmission element 450 is snapped into the shallow latching depression 470, no recoupling of the force transmission element into the locking base 430 will occur. The force transmission element 450 is held in the shallow latching depression 480 by the spring 440 which presses the force transmission element 450 in the direction of the inertia element 460.

The force transmission element 450 is preferably configured in terms of its material and dimensioning in such a way that it can break off in the event of an accident, without previous belt tautening, for example in the event of a defective tautener drive, so that force transmission between the locking base 430 and the belt reel 410 can take place via the torsion bar and the torsion bar can twist, even if the force transmission element 450 has not previously been brought into its inactive position.

LIST OF REFERENCE SYMBOLS

10 Belt retractor
20 Force limitation device
30 Torsion bar
40 Torsion bar
50 Coupling device
60 Driving wheel
70 Coupling wheel
80 Frame
90 Spindle connection part
100 Internal toothing
110 Belt spindle/belt reel
120 Connection portion
130 Locking base
140 Recess
150 Connecting pin
160 Guide slot
170 Connecting pawl
180 Coupling teeth
200 Connection portion
250 Slot end
260 Ramp/oblique face
270 Ramp/oblique face
410 Belt spindle/belt reel
430 Locking flange
440 Spring 450 Force transmission element
460 Inertia element
470 Deep latching depression
480 Shallow latching depression
485 Recess
490 Guide recess
R Axis of rotation

The invention claimed is:

1. A belt retractor for a safety belt, comprising:
a belt spindle for winding up and unwinding the safety belt;
a lockable locking flange connected to the belt spindle;
a force transmission element, which is held in a recess of the belt spindle and can be in engagement with the locking flange and can connect the belt spindle to the locking flange;
a tautener drive; and
an inertia element located between the belt spindle and the locking flange and being movable between a first position and a second position relative to the belt spindle, the inertia element including a first latching depression and a second latching depression, with the first latching depression being deeper than the second latching depression;
wherein the force transmission element is guided displaceably in the recess of the belt spindle and is capable of assuming an interlock position and a release position,
wherein the force transmission element projects further out of the recess in the interlock position than in the release position, with the result that the force transmission element and the locking flange are in engagement,
wherein the force transmission element is introduced more deeply into the recess in the release position, and the force transmission element and locking flange being out of engagement,
wherein the inertia element is held in a guide recess in the belt spindle, which is adapted to the form of the inertia element,
wherein the guide recess is larger in a longitudinal direction of the guide recess than the inertia element and provides an additional length in the longitudinal direction of the guide recess with respect to the inertia element to allow the inertia element to move in the longitudinal direction of the guide recess relative to the guide recess between the first and second positions,
wherein the first latching depression is configured such that when the inertia element is in the first position, the force transmission element engages into the first latching depression and assumes the interlock position,
wherein the second latching depression is configured such that when the inertia element is in the second position, the force transmission element assumes its release position and engages into the second latching depression,
wherein the recess of the belt spindle is a blind hole, and
wherein a length of the guide recess is at least equal to a length between the first and second latching depressions, such that if the belt spindle is abruptly set in rotational movement by the tautener drive, then the inertia element is displaced in the guide recess as a consequence of inertia from the first position to the second position to allow the force transmission element to be active only in a phase prior to belt tautening.

2. The belt retractor of claim 1, wherein the force transmission element is movable in an axial direction in the recess of the belt spindle between the interlock and release positions.

3. The belt retractor of claim 2, wherein the force transmission element includes a connecting pin.

4. The belt retractor of claim 3, wherein the force transmission element further includes an end having a U-shape that is configured to engage the inertia element.

5. The belt retractor of claim 2, wherein when the inertia element is in the first position, the force transmission element is pressed into the recess of the belt spindle to a lesser depth relative to when the inertia element is in the second position, so that the force transmission element is in engagement with the locking flange.

6. The belt retractor of claim 5, wherein when the inertia element is in the second position, the force transmission element is out of engagement with the locking flange.

7. The belt retractor of claim 6, wherein the first latching depression is ramp-shaped and includes a low-inclination flank and a steep flank, and wherein the low-inclination flank faces toward the second latching depression and the steep flank faces away from the second latching depression.

8. The belt retractor of claim 1, further comprising a spring that is located in the blind hole and is configured to press the force transmission element out of the blind hole toward the locking flange.

9. A belt retractor for a safety belt, comprising:
a belt spindle for winding up and unwinding the safety belt;
a lockable locking flange connected to the belt spindle;
a force transmission element, which is held in a recess of the belt spindle and can be in engagement with the locking flange and can connect the belt spindle to the locking flange;
a tautener drive; and
an inertia element movable between a first position and a second position relative to the belt spindle, the inertia element being formed by a ring segment covering a circle angle of between 45 and 315 degrees, the inertia element including a latching depression;
wherein the force transmission element is guided displaceably in the recess of the belt spindle and is capable of assuming an interlock position and a release position,
wherein the force transmission element projects further out of the recess in the interlock position than in the release position, with the result that the force transmission element and the locking flange are in engagement,
wherein the force transmission element is introduced more deeply into the recess in the release position, and the force transmission element and locking flange being out of engagement,
wherein the inertia element is held in a guide recess in the belt spindle which is adapted to the form of the inertia element,
wherein the guide recess is larger in a longitudinal direction of the guide recess than the inertia element and provides an additional length in the longitudinal direction of the guide recess with respect to the inertia element to allow the inertia element to move in the longitudinal direction of the guide recess relative to the guide recess between the first and second position,
wherein the latching depression is configured such that when the inertia element is in the first position, the force transmission element engages into the latching depression and assumes the interlock position,
wherein the guide recess is configured such that when the inertia element is in the second position, the force transmission element assumes its release position, and
wherein the inertia element is displaced in the guide recess from the first position to the second position as a consequence of inertia, if the belt spindle is abruptly set in rotational movement by the tautener drive, in order to allow the force transmission element to be active only in a phase prior to belt tautening.

10. The belt retractor of claim 9, wherein the inertia element is located between the belt spindle and the locking flange.

11. The belt retractor of claim 9, wherein, when in the second position, the force transmission element is outside of the latching depression.

12. The belt retractor of claim 9, wherein the recess of the belt spindle is a blind hole.

13. The belt retractor of claim 9, further comprising a spring that presses the force transmission element toward the inertia element.

14. The belt retractor of claim 9, wherein the force transmission element has a U-shaped cross section.

* * * * *